United States Patent [19]

Nakashio et al.

[11] 3,920,770

[45] Nov. 18, 1975

[54] RUBBER MODIFIED POLYPHENYLENE OXIDE COMPOSITION

[75] Inventors: Seizo Nakashio, Nishinomiya; Isao Maruta, Takatsuki; Kazuo Hayatsu, Takatsuki; Yoichi Kono, Takatsuki, all of Japan

[73] Assignee: Sumitomo Chemical Company, Ltd., Osaka, Japan

[22] Filed: Dec. 10, 1969

[21] Appl. No.: 884,041

[30] Foreign Application Priority Data

Dec. 27, 1968 Japan.................................. 44-543

[52] U.S. Cl............ 260/897 R; 260/45.95; 260/823; 260/824 R; 260/876 R; 260/876 B; 260/887; 260/888; 260/889; 260/890; 260/892; 260/893; 260/896; 260/898

[51] Int. Cl.²......................................... C08L 23/16

[58] Field of Search ....... 260/876, 874, 887, 47 ET, 260/897

[56] References Cited
UNITED STATES PATENTS

| | | | |
|---|---|---|---|
| 3,361,851 | 1/1968 | Gowan............................... | 260/897 |
| 3,383,340 | 5/1968 | MacCallum et al. ............... | 260/887 |
| 3,383,435 | 5/1968 | Cizek.................................. | 260/874 |
| 3,472,810 | 10/1969 | Gowan............................... | 260/897 |
| 3,487,127 | 12/1969 | Erchak et al. ..................... | 260/876 |

*Primary Examiner*—Carman J. Seccuro
*Attorney, Agent, or Firm*—Stevens, Davis, Miller & Mosher

[57] ABSTRACT

A novel composition which has been improved in elongation and impact resistance is obtained by blending polyphenylene oxide with a small amount of a rubbery polymer, while said composition still retains excellent properties inherent to polyphenylene oxide itself, as they are, for example, thermal resistance, chemical resistance, mechanical and electrical properties. The amount of the rubbery polymer to be blended is less than 10 % by weight, preferably 0.5 to 5 % by weight, based on the weight of the whole composition. As the rubbery polymer, there may be used such rubbery polymers as obtained from conjugated diolefins, olefins, vinyl compounds and alkylene oxide. The above-mentioned two components of composition may be blended together according to a mechanical mixing method, solution mixing method or latex mixing method.

2 Claims, No Drawings

RUBBER MODIFIED POLYPHENYLENE OXIDE COMPOSITION

This invention relates to a polyphenylene oxide composition containing a rubbery polymer.

Polyphenylene oxide is being watched with keen interest as a resin excellent in such properties as thermal resistance, chemical resistance, mechanical and electrical properties, but it is not markedly high in elongation and impact resistance.

Aiming at a further improvement in elongation and impact resistance without deteriorating excellent properties inherant to polyphenylene oxide itself, the present invention provides a novel polyphenylene oxide composition containing a rubbery polymer which has good compatibility with polyphenylene oxide when blended therewith.

Mixtures of polyphenylene oxide and rubber have already been known from Japanese Patent No. 1482/68 and Dutch patent application No. 66-06421. In these cases, however, the objective products are compositions composed principally of rubber. The aforesaid Japanese Patent discloses that the amount of polyphenylene oxide to be blended is preferably less than 40 parts per 60 parts of the rubber with which the polyphenylene oxide is blended, while the aforesaid Dutch patent application describes that the amount of polyphenylene oxide to be blended is desirabley 10 to 150 parts per 100 parts of the rubber with which the polyphenylene oxide is blended. The rubber composition of this sort, however, does not make at all the best use of excellent thermal resistance inherent to polyphenylene oxide.

In contrast thereto, the present inventors have found that polyphenylene oxide can markedly be improved in impact resistance without deteriorating thermal resistance inherent thereto by blending the polyphenylene oxide with a small amount of a rubbery polymer. Thus, the present invention has been accomplished on the basis of the above finding.

The polyphenylene oxide used in the present invention has a structural unit represented by the general formula,

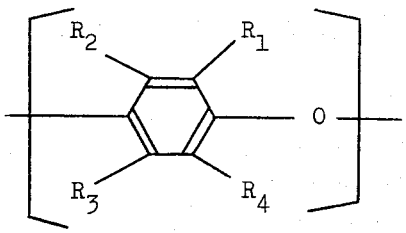

wherein $R_1$, $R_2$, $R_3$ and $R_4$ are individually hydrogen, halogen, hydrocarbon groups, substituted hydrocarbon groups, cyano groups, hydrocarbonoxy groups, substituted hydrocarbonoxy groups, amino or substituted amino groups or nitro groups. Examples of $R_1$, $R_2$, $R_3$ and $R_4$ include hydrogen, chlorine, bromine, iodine, methyl, ethyl, propyl, allyl, phenyl, benzyl, methylbenzyl, chloromethyl, bromomethyl, cyanoethyl, cyano, methoxy, ethoxy, chloromethoxy, cyanoethoxy, phenoxy, p-chlorophenoxy, amino and nitro groups.

Specific examples of the polyphenylene oxide include, for example, poly-2,6-dimethyl-1,4-phenylene oxide, poly-2,6-diethyl-1,4-phenylene oxide, poly-2,6-dipropyl-1,4-phenylene oxide, poly-2-methyl-6-allyl-1,4-phenylene oxide, poly-2,6-dimethoxy-1,4-phenylene oxide, poly-2,6-dichloromethyl-1,4-phenylene oxide, poly-2,6-dibromomethyl-1,4-phenylene oxide, poly-2,6-ditolyl-1,4-phenylene oxide, poly-2,6-dichloro-1,4-phenylene oxide, poly-2-amino-6-methyl-1,4-polyphenylene oxide, poly-2,5-dimethyl-phenylene oxide, poly-2-methyl-6-nitro-1,4-phenylene oxide and poly-2,6-diphenyl-1,4-phenylene oxide.

The rubbery polymers used in the present invention are those obtained from conjugated diolefins, olefins, vinyl compounds and alkylene oxides. These rubbery polymers include, for example, polybutadiene, polyisoprene (including natural rubber), polychloroprene, ethylene-propylene rubber, ethylene-propylene-diene terpolymer, polyisobutyrene, butadiene-styrene copolymer, butadiene-styrene block copolymer, polybutadiene-styrene graft copolymer, polyisoprene-styrene graft copolymer, isoprene-styrene copolymer, poly-(butadiene-acrylonitrile)-styrene graft copolymer, butadiene-acrylonitrile copolymer, poly-(butadiene-styrene)-α-methylstyrene graft copolymer, poly-(butadiene-sytrene)-methyl methacrylate graft copolymer, poly-(butadiene-styrene)-styrene graft copolymer, poly-(butadiene-styrene)-styrene-acrylonitrile graft copolymer, polychloroprene-styrene graft copolymer, poly-(butadiene-acrylonitrile)-styrene graft copolymer, nitrile rubber, butyl rubber, silicone rubber, acryl rubber, fluorine rubber, butadiene-acrylonitrile alternating copolymer rubber, isobutylene-acrylic ester alternating copolymer rubber, polyethylene oxide, polypropylene oxide and polyepichloro-hydrin.

In the case of graft copolymers of diene rubbers, the rubber particle size thereof ranges preferably from 0.1 $\mu$ to 10 $\mu$.

The process of the present invention can be carried out by a variety of procedures. Suitable as the procedure utilized in the process of the present invention, may be either of such a mechanical mixing method as by roll mill or Banbury mixer or a solution or suspension mixing method. For example, a rubbery polymer latex may be added to and mixed with a synthesis reaction mixture solution of the polyphenylene oxide.

In order to retain the properties inherent to polyphenylene oxide, i.e. thermal resistance and the like, the amount of rubbery polymer to be blended is less than 10% by weight, preferably 0.5 to 5% by weight, based on the weight of the whole composition.

The present composition in which the polyphenylene oxide has been blended with the rubbery polymer in a preferable blending ratio has such mechanical characteristics as imparting excellent properties to the said composition as shown in the following examples. In the examples, all parts are by weight unless otherwise specified. In addition to rubbery polymer, stabilizers, pigments, dyestuffs or fillers can be added to the present composition.

EXAMPLE 1

Compositions were formulated by blending poly-2,6-dimethyl-1,4-phenylene oxide ($[\eta] = 0.65$ dl/g in chloroform at 25°C) which had been obtained by oxidative coupling reaction of 2,6-dimethylphenol using manganese chloride (II)-sodium methylate as a catalyst with polybutadiene (JSR 0700 Polybutadiene produced by Japan Synthetic Rubber Co.) in blending ratios as shown in the following table, each of said compositions being incorporated with as stabilizers 0.5% by weight based on total composition of 2,2'-methylene-bis-(6- tert.-butyl-4-methylphenol) (Sumilizer MDP, a registered trade mark, produced by Sumitomo Chemical Co., Ltd., and the same shall apply hereinafter) and 0.5% by weight based on total composition of trisnonylphenyl phosphite (Sumilizer TNP, a registered trade mark, produced by Sumitomo Chemical Co., Ltd., and the same shall apply hereinafter). The compositions thus formulated were subjected to tests to determine their respective mechanical properties. The results obtained are shown in the following table.

| | | | | |
|---|---|---|---|---|
| Polyphenylene oxide (part) | 100 | 99 | 95 | 90 |
| Polybutadiene (part) | 0 | 1 | 5 | 10 |
| Elongation (%) | 30 | 56 | 70 | 95 |
| Charpy impact value (Kg.cm/cm²) | 9 | 12 | 18 | 21 |
| Vicat softening point (°C) | 200 | 198 | 193 | 184 |

The composition for the following tests was prepared by rolling at 270°–280°C for 5 minutes, and then hot pressing at 260°C under a pressure of 150 Kg/cm² for 10 minutes.

The impact test was conducted in accordance with JIS-6745 to obtain Charpy impact strength (with notch : 20°C). Vicat softening point was measured according to ASTM-D-1525-65T. The tension test was conducted in accordance with JIS-6745 at a rate of 10 mm/min. (20°C).

EXAMPLE 2

A composition composed of 97 parts of polyphenylene oxide which had been used in Example 1 and 3 parts of polypropylene oxide rubber (molecular weight : 200,000) was incorporated with as stabilizers 0.5% by weight based on the total composition of 2,2'-methylene-bis-(6-tert.-butyl-4-methylphenol) and 0.5% by weight based on the total composition of trisnonyl-phenyl phosphite. The composition was subjected to tests in the same manner as in Example 1 to determine its mechanical properties. The results obtained are shown in the following table together with those of the polyphenylene oxide as a control.

| | Polyphenylene oxide alone | Present composition |
|---|---|---|
| Elongation (%) | 30 | 55 |
| Charpy impact value (Kg.cm/cm²) | 9 | 14 |
| Vicat softening point (°C) | 200 | 197 |

EXAMPLE 3

A composition composed of 96 parts of the polyphenylene oxide use in Example 1 and 4 parts of ethylene-propylene rubber (EPR Dutral N, produced by Montecatini Edison Co.) as a remainder was incorporated with the stabilizers used in Example 1 in the same proportions. The composition thus formulated was subjected to tests in the same manner as in Example 1 to determine its mechanical properties. The results obtained are shown in the following table together with those of the polyphenylene oxide as a control.

| | Polyphenylene oxide alone | Present composition |
|---|---|---|
| Elongation (%) | 30 | 65 |
| Charpy impact value (Kg.cm/cm²) | 9 | 20 |
| Vicat softening point (°C) | 200 | 195 |

EXAMPLE 4

A composition composed of 95 parts of polyphenylene oxide used in Example 1 and 5 parts of ethylene-propylene-diene terpolymer (Royalen 301 produced by Uniroyal Co.) was incorporated with the stabilizers used in Example 1 in the same proportions. The resultant composition was subjected to tests in the same manner as in Example 1 to determine its mechanical properties. The results obtained are shown in the following table together with those of the polyphenylene oxide alone as a control.

| | Polyphenylene oxide alone | Present composition |
|---|---|---|
| Elongation (%) | 30 | 60 |
| Charpy impact value (kg.cm/cm²) | 9 | 17 |
| Vicat softening point (°C) | 200 | 194 |

EXAMPLE 5

A composition composed of 95 parts of the polyphenylene oxide and 5 parts of butadiene-acrylonitrile alternating copolymer rubber was incorporated with the stabilizers used in Example 1 in the same proportions. The resultant composition was subjected to tests in the same manner as in Example 1 to determine its physical properties. The results obtained are shown below.

| | |
|---|---|
| Elongation (%) | 60 |
| Charpy impact value (kg.cm/cm²) | 19 |
| Vicat softening point (°C) | 189 |

EXAMPLE 6

Compositions were formulated by blending 95 parts of the polyphenylene oxide used in Example 1 with 5 parts each of polybutadiene-styrene graft copolymers (styrene : butadiene = 4 : 6, and average rubber particle sizes being 0.2 μ, 2 μ and 5 μ respectively), each of said composition being incorporated with the stabilizers used in Example 1 in the same proportions. The resultant compositions were subjected to tests in the same manner as in Example 1 to determine their respective physical properties. The results obtained are shown in the following table.

| Average rubber particle size | 0.2 μ | 2 μ | 5 μ |
|---|---|---|---|
| Elongation (%) | 62 | 63 | 63 |
| Charpy impact value (Kg.cm/cm²) | 13 | 15 | 16 |

-continued

| Average rubber particle size | 0.2 μ | 2 μ | 5 μ |
|---|---|---|---|
| Vicat softening point (°C) | 194 | 195 | 198 |

What is claimed is:

1. A polyphenylene oxide composition comprising a mixture of polyphenylene oxide having a structural unit represented by the general formula

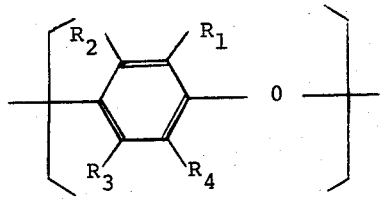

wherein $R_1$, $R_2$, $R_3$ and $R_4$ are hydrogen, halogen, hydrocarbon groups, substituted hydrocarbon groups, cyano groups, hydrocarbonoxy groups, substituted hydrocarbonoxy groups, amino or substituted amino groups or nitro groups, and 0.5 to 10% by weight of a rubbery ethylene-propylene-diene terpolymer based on the weight of the whole composition.

2. A polyphenylene oxide composition comprising a mixture of polyphenylene oxide having a structural unit represented by the general formula

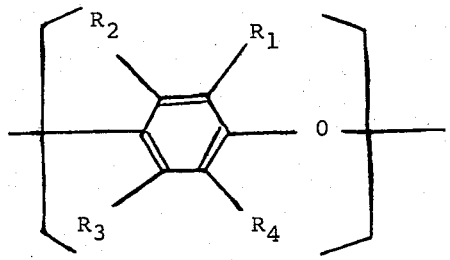

wherein $R_1$, $R_2$, $R_3$ and $R_4$ are hydrogen, halogen, hydrocarbon groups, substituted hydrocarbon groups, cyano groups, hydrocarbonoxy groups, substituted hydrocarbonoxy groups, amino or substituted amino groups or nitro groups, and 0.5 to 10% by weight of a rubbery ethylene-propylene-non-conjugated diene terpolymer based on the weight of the whole composition.

* * * * *